US00RE37241E

(19) United States
(12) Reissued Patent
Gustafson

(10) Patent Number: US RE37,241 E
(45) Date of Reissued Patent: Jun. 26, 2001

(54) SOLENOID CONTROLLED VARIABLE PRESSURE INJECTOR

(75) Inventor: Richard J. Gustafson, Columbus, IN (US)

(73) Assignee: Cummins Engine Company, Inc., Columbus, IN (US)

(21) Appl. No.: 09/507,372

(22) Filed: Feb. 18, 2000

Related U.S. Patent Documents

Reissue of:
(64) Patent No.: 5,094,215
Issued: Mar. 10, 1992
Appl. No.: 07/592,275
Filed: Oct. 3, 1990

(51) Int. Cl.[7] ..... F02M 37/04; F02M 59/20
(52) U.S. Cl. ..... 123/500; 123/496; 123/447; 239/89; 239/96
(58) Field of Search ..... 123/500, 501, 123/496, 506, 446, 447; 239/88–96

(56) References Cited

U.S. PATENT DOCUMENTS

| | | |
|---|---|---|
| 3,913,537 | 10/1975 | Ziesche et al. . |
| 3,951,117 | 4/1976 | Perr . |
| 4,129,253 | 12/1978 | Bader, Jr. et al. . |
| 4,235,374 | 11/1980 | Walter et al. . |
| 4,275,693 | 6/1981 | Leckie . |
| 4,281,792 | 8/1981 | Sisson et al. . |
| 4,392,612 | 7/1983 | Deckard et al. . |
| 4,396,151 | 8/1983 | Kato et al. . |
| 4,463,901 | 8/1984 | Perr et al. . |
| 4,531,672 | 7/1985 | Smith . |
| 4,711,216 | 12/1987 | Takeuchi et al. . |
| 4,718,384 | 1/1988 | Takahashi . |
| 4,811,715 | 3/1989 | Djordjevic et al. . |

FOREIGN PATENT DOCUMENTS 0 323 591 7/1989 (EP) .

*Primary Examiner*—Thomas N. Moulis
(74) *Attorney, Agent, or Firm*—Nixon Peabody LLP; Charles M. Leedom, Jr; Tim L. Brackett, Jr

(57) ABSTRACT

A unit fuel injector adapted to receive fuel from a fuel supply at relatively low pressure and adapted to inject fuel at relatively high pressure into the combustion chamber of an internal combustion engine is provided, comprising an injector body having a first internal bore and an injector orifice and a plunger mounted for reciprocating movement within the first internal bore to define a variable volume fuel pressurization chamber including a cam actuated upper plunger portion and a lower plunger portion mounted in the first internal bore between the variable volume fuel pressurization chamber and the upper plunger portion. While the upper plunger portion is in its retracted position, low pressure fuel from the fuel supply is supplied to the variable volume fuel pressurization chamber. A spring is positioned within the first internal bore to bias the upper and lower plunger portions apart to thereby allow for variation of the volume of fuel which flows into the variable volume fuel pressurization chamber during each cycle of injection operation in dependence on the pressure of the fuel from the fuel supply. A valve assembly including a valve element mounted for reciprocating movement within a second internal bore controls the flow of fuel from the variable volume fuel pressurization chamber to the injector orifice. The valve assembly allows fuel to be discharged through the injector orifice only during the time when the upper plunger portion is in its fully advanced position so that injection pressure is independent of the velocity at which the upper plunger portion moves between its retracted and advanced position.

115 Claims, 5 Drawing Sheets

94 ECI SENSITIVIT
22000 PSI. 230 MM**3

SOLENOID CONTROLLED VARIABLE PRESSURE INJECTOR

Matter enclosed in heavy brackets [ ] appears in the original patent but forms no part of this reissue specification; matter printed in italics indicates the additions made by reissue.

TECHNICAL FIELD

The present invention relates to an improved electronically controlled unit fuel injector for providing accurate control and variation of the timing of injection, the metering of the proper quantity of fuel and the pressure at which the fuel is injected.

BACKGROUND OF THE INVENTION

Unit fuel injectors operated by cams, have long been used in compression ignition internal combustion engines for their accuracy and reliability. The unit injector typically includes an injector body having a nozzle at one end and a cam driven injector plunger mounted for reciprocating movement within the injector body. In the typical unit fuel injector, a link, which is cam actuated, physically communicates with a lower, intermediate or upper plunger which moves inwardly, during the injection event, to force fuel either into an injection chamber and out an injector orifice or directly out of an injector orifice on a cycle-by-cycle basis. To achieve optimal engine operation fuel must be injected at very high pressure to cause the maximum possible atomization of the injected fuel. In addition, the interval of injection needs to be carefully timed during each cycle of injector operation in dependence upon the movement of the corresponding engine piston.

Internal combustion engines are subjected to a variety of external as well as internal variable conditions ultimately affecting the performance of the engine. Examples of such conditions are engine load, ambient air pressure and temperature, timing, power output and the type and amount of fuel being consumed. In order to satisfy the increased need for higher engine efficiency and pollution abatement, accurate control over and a means for varying (1) the timing of injection, (2) the metering of the proper quantity of fuel and (3) the injection pressure in response to changing engine operating conditions is required.

Attempts to provide independent control over these parameters from one cycle to the next have, in most cases, been unsuccessful due, in part, to the way in which fuel is supplied to the injector. In most cases fuel is pumped from a source by way of a low pressure rotary pump or gear pump to the unit injector which may be thought of as a high pressure pump. Such high pressure pumps conventionally include a positive displacement piston driven by a cam which is mounted on an engine driven cam shaft. High pressure pumps of the electrical, mechanical, hydraulic or electromechanical types are known as well, however, these systems often lack reliable independent control over the various injection parameters from cycle to cycle.

Other attempts to independently vary these key injection parameters have, in many cases, failed due to their dependence upon other engine operating conditions. For example, injection pressure, in the typical unit fuel injector, is dependent upon the velocity of the inward movement of a cam actuated injector plunger during the injection event. In unit fuel injectors of this type, the injector plunger is mechanically connected to the engine cam shaft and, as a result, injection pressure is dependent upon engine speed.

Therefore, the injection pressure cannot be adequately varied for each cycle of injection operation to provide improved efficiency in engine operation and pollution abatement.

A well known approach to solving the lack of cycle-by-cycle control capability is to employ a solenoid valve in combination with the unit injector to vary the quantity and timing of injection during each cycle. For example, in U.S. Pat. Nos. 4,129,253 to Bader et al. and 4,392,612 to Deckerd et al., an electromagnetic unit fuel injector is disclosed including a single, cam operated injector plunger, an electromagnetic valve for determining the beginning and ending of injection, and thus, the timing and quantity of fuel injected during each cycle of plunger movement, and a tip-mounted valve for resisting blow back of exhaust gases into the high pressure chamber of the injector while allowing fuel to be injected into the cylinder. Injector assemblies of this type are often referred to as jerk-type unit injectors.

As is shown in the above-mentioned patents, injection pressure is controlled and determined by a fixed displacement pump structure so as to permit the intensification of the fuel pressure and injection of fuel to provide both a pilot and a main charge injection. Although the fuel pressure levels obtained during both high load and low load engine operation is sufficient to provide for injection, the fixed displacement and volume of fuel supplied by the unit injector pump does not allow for high accuracy in the control of the timing of injection or metering of a quantity of fuel under varying conditions at or close to maximum peak pressures. The inability of these types of injectors to operate at maximum peak pressures under varying conditions, from low load to high load engine operation, results in a degradation of the engines ultimate performance.

Other unit fuel injection systems attempt to solve the lack of cycle-by-cycle control capability by varying the quantity and timing of injection during each cycle by a collapsible hydraulic link to selectively change the effective length of the cam operated fuel injector plunger. For example, in U.S. Pat. No. 4,463,901 to Perr et al., a unit fuel injector is disclosed including a three part, cam operated injector plunger defining within an internal bore a variable volume injection chamber, a variable volume timing chamber and a variable volume compensation chamber in which is mounted a biasing means for biasing the plunger sections defining the compensation chamber in opposite directions to collapse the timing and injection chambers. Control and variation of the timing of injection for each cycle of injection operation is achieved in dependence upon the volume of fuel supplied to the timing chamber, thereby defining the length of the hydraulic link formed therein. The amount of fuel is independently controlled by the volume of fuel supplied to the injection chamber. The amount of fuel supplied to the respective timing and injection chambers is affected by the spring constant of the biasing spring located in the compensation chamber. While providing for accurate independent control and variation of the timing of injection and metering of the proper quantity of fuel, the unit fuel injector of Perr et al. '901 does not allow for variation of injection pressure for each cycle of injection operation in response to the changing engine operating conditions, independent of engine speed. Similar types of unit fuel injectors including two-part plunger assemblies are disclosed in U.S. Pat. No. 4,531,672 to Smith, U.S. Pat. No. 4,281,792 to Sisson et al. and U.S. Pat. No. 4,235,374 to Walter et al.

In the typical unit fuel injectors, such as those discussed above, the actual cycle-by-cycle injection of the pressurized fuel through the injector orifice is achieved by inward movement of a plunger connected to a link driven by the engine cam shaft during the injection event. Injection pressure for each cycle of injection operation for injectors operating in this manner is dependent upon engine speed. Control over and variation of this parameter is necessary to achieve optimal engine operation and is not possible where such control and variation is dependent on engine speed. In addition, to achieve and maintain the maximum peak pressure to ensure maximum possible atomization of the injected fuel, the plunger, which travels inwardly during the injection event, must travel inwardly with an extremely high velocity and the injection event must occur over a relatively short time span. The typical time interval for the injection event is in the range of 2–4 milliseconds. High velocity movement of the plunger in a short time period requires a high rate of acceleration, which, in a cam actuated unit fuel injector, is determined by the cam profile.

As is well known, the contour or shape of the lift ramp of the cam Will determine the rate of acceleration of the plunger. To achieve the necessary high velocity in a short period of time, a high rate of acceleration is required which can only be achieved by a cam lobe exhibiting very sharp radii of curvature (i.e. sharply angled lift ramp). The lift profile of the cam in a fuel injector that injects fuel in this manner is characterized by a lift ramp having a very sharp angle which is disadvantageous in that such a design greatly increases cam hertz stresses, resulting in increased wear on the cam and cam follower surfaces.

Attempts have been made to provide a unit fuel injector in which the injection event does not occur concurrently with the inward movement of a plunger connected to the engine cam shaft (i.e., the cam, link and plunger assemblies), thereby, eliminating the need for the higher rates of acceleration required by the fuel injectors described above. For example, U.S. Pat. No. 4,275,693 to Leckie discloses a fuel injection timing and control device wherein injection of fuel, which is pressurized by way of a plunger/piston arrangement, is carried out by the use of a solenoid controlled sleeve tip valve, wherein the solenoid is mounted coaxially with the central axis of the injector body. Fuel is supplied to an accumulator, which is provided with a piston slidably disposed in a bore, movable upwardly against the bias of a spring and a relief valve to relieve pressure within the accumulator above a predetermined level. The fuel is continuously maintained at a constant pressure level during the preinjection, injection and post-injection events. When the solenoid is activated, the tip valve allows a metered portion of the pressurized fuel in the accumulator to be injected through discharge passages. Pressurization of fuel within the accumulator of the injector is disassociated from timing and duration of fuel injection, which is controlled solely by the energization of a solenoid. Injection, thus, occurs independently of any mechanical connection to the cam shaft.

In the operation of the fuel injector disclosed in Leckie, the pressure of the fuel in the accumulator is relatively constant, resulting in a corresponding relatively constant injection pressure. Injection pressure is controlled by the spring constant of the spring biasing the piston defining the accumulator in conjunction with the relief valve arrangement. Therefore, while independent of engine speed, the fuel injector of Leckie cannot allow for variation of injection pressure for each cycle of injection operation in response to engine operating conditions to optimize engine efficiency and pollution abatement. Moreover, Leckie's use of a pressure relief valve causes the excess energy stored in the fuel within the accumulator to be wastefully lost upon opening of the relief valve.

Consequently, there is a need for a unit fuel injector Wherein the injection event does not necessarily occur concurrently with the inward movement of a plunger connected to the engine cam shaft, in which the accurate control over and variation of the timing of injection, the metering of the proper quantity of fuel and the injection pressure is possible independent of engine speed.

SUMMARY OF THE INVENTION

It is an object of the present invention to provide a unit fuel injector which will allow for greater accuracy in the control and variation of the timing of injection, the metering of the proper quantity of fuel and the injection pressure.

Another object of the present invention is to provide a unit fuel injector wherein injection pressure can be varied for each cycle of injection operation substantially independent of engine speed.

A further object of the present invention is to provide a unit fuel injector wherein fuel is injected through an injector orifice into a combustion chamber at a pressure level which is dependent on variation in the level of pressure of the fuel received from a fuel supply and which is independent of changes in the velocity of the reciprocating movement of a plunger mechanically connected to the engine cam shaft.

Yet another object of the present invention is to provide a unit fuel injector wherein controlling the volume of low pressure fuel supplied to a variable volume fuel pressurization chamber during each cycle of injection operation allows for the accurate control and variation of the pressure at which fuel is injected through an injector orifice into the combustion chamber of an engine within the same cycle of injection operation, thereby allowing for maximum average injection pressures throughout the full range of engine speeds.

Still another object of the present invention is to provide a unit fuel injector wherein the energy stored in the fuel remaining in a variable volume fuel pressurization chamber following each injection event is returned to the engine cam shaft during each injection cycle due to the elastic compressibility of the fuel.

Yet another object of the present invention is to provide a unit fuel injector wherein injection pressure may be varied in response to a hydraulic control signal and both the timing of injection and the quantity of fuel injected can be accurately controlled and varied during each cycle of injection operation in response to an electrical Control signal.

Still another object of the present invention is to provide a unit injector wherein the inward movement of a plunger mechanically connected to the engine cam shaft is decoupled from the injection event, thereby substantially reducing hertz stresses placed on the mechanical portions of the fuel injector resulting in less wear on the cam and cam follower surfaces.

Yet another object of the present invention is to provide an improved cam operated unit fuel injector which includes a cam lobe devoid of sharp radii of curvature, thereby providing a profile including a plunger advancement segment (i.e. lift profile) which is shaped to cause the injector plunger rate of acceleration and velocity to be relatively low to reduce substantially the hertz stresses placed on the mechanical portions of the fuel injector and to cause less wear on the cam and cam follower surfaces. In particular, it is an object of the disclosed invention to achieve high injection pressure by means of a cam devoid of the sharp radii of curvature as would be required for achieving the same high level of injection pressure by means of conventional cam actuated unit injectors.

Another object of the present invention is to provide an injector having a plunger connected to a cam actuated link including a lower plunger portion and an upper plunger portion separated by a spring therebetween which will allow the volume of fuel trapped in the injector to be varied resulting in a more compliant system able to achieve higher average fuel injection pressures for each injection event given the same peak injection pressure and the same amount of fuel discharged per cycle.

These and other objects of the present invention are achieved by providing a unit fuel injector adapted to receive fuel from a fuel supply at relatively low pressure and adapted to inject fuel at relatively high pressure into the combustion chamber of an internal combustion engine, comprising an injector body having a first internal bore and an injector orifice and a plunger mounted for reciprocating movement within the first internal bore to define a variable volume fuel pressurization chamber including a cam actuated upper plunger portion and a lower plunger portion mounted in the first internal bore between the variable volume fuel pressurization chamber and the upper plunger portion. While the upper plunger portion is in its retracted position, low pressure fuel from the fuel supply is supplied to the variable volume fuel pressurization chamber. A spring is positioned within the first internal bore to bias the upper and lower plunger portions apart to thereby allow for variation of the volume of fuel which flows into the variable volume fuel pressurization chamber during each cycle of injection operation in dependence on the pressure of the fuel from the fuel supply. A valve assembly including a solenoid operated valve element mounted for reciprocating movement within a second internal bore controls the flow of fuel from the variable volume fuel pressurization chamber to the injector orifice in dependence on an electrical control signal. The electrical control signal is timed to cause fuel to be discharged through the injector orifice only during the time when the upper plunger portion is in its fully advanced position so that injection pressure is independent of the velocity at which the upper plunger portion moves between its retracted and advanced position.

DETAILED DESCRIPTION OF THE PREFERRED EMBODIMENT

Throughout this application, the words "inward", "innermost", "outward" and "outermost" will correspond to the directions, respectively, toward and away from the point at which fuel from an injector is actually injected into the combustion chamber of an engine. The words "upper" and "lower" will refer to the portions of the injector assembly which are, respectively, farthest away and closest to the engine cylinder when the injector is operatively mounted on the engine.

Figure 1:
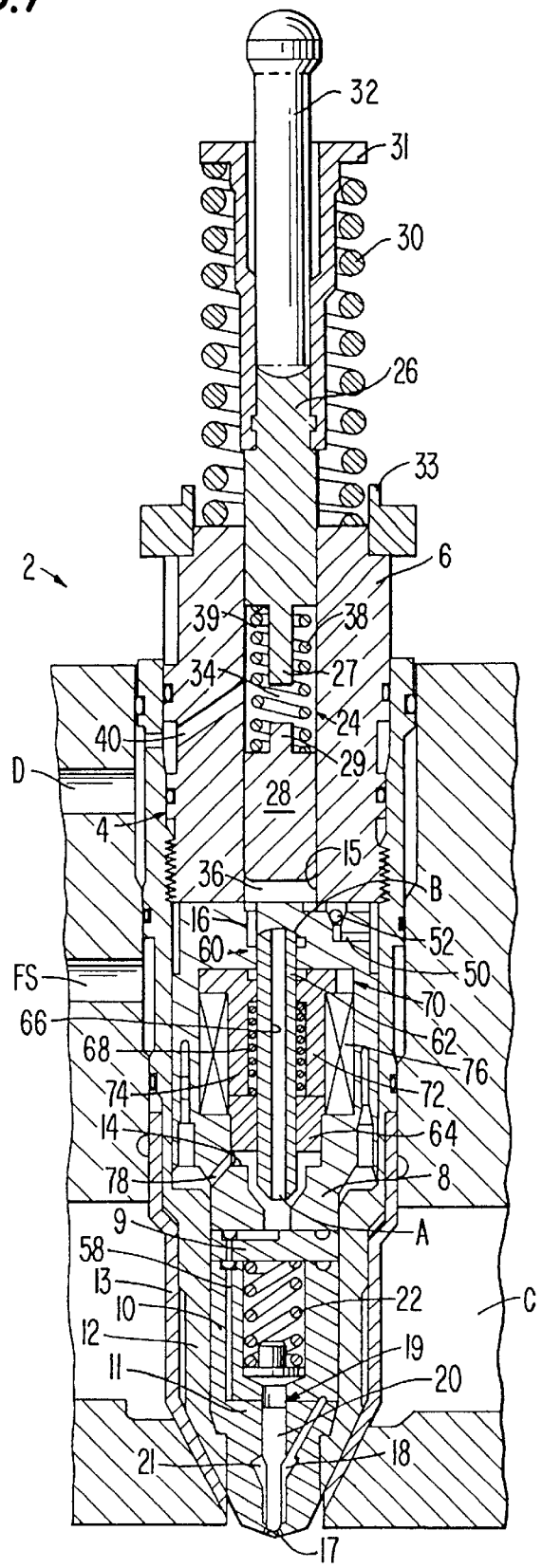
FIG. 1 is a cross-sectional view of the electronically controlled unit fuel injector designed in accordance with a preferred embodiment of the invention.

Referring to FIG. 1, fuel injector assembly 2 includes an injector body 4 formed from an outer barrel 6, an inner barrel 8, a disc 9, a spring housing 10, and a nozzle housing 11. The inner barrel 8, disc 9, spring housing 10, and nozzle housing 11 are all held in abutting relationship against the bottom of outer barrel 6 by means of an injector cup 12 containing an internal cavity adapted to receive these elements in stacked configuration as illustrated in FIG. 1. The outer end of the injector cup 12 contains internal threads for engaging corresponding external threads on the lower end of outer barrel 6 to permit the entire unit injector 2 to be held together by simple relative rotation of cup 12 with respect to the outer barrel 6. An outer housing 13 contains an internal cavity adapted to receive injector cup 12. A coolant passage C is also provided for directing the flow of coolant around the outer housing 13 of the injector 2 to provide a means for cooling the injector.

The outer barrel 6 contains first internal bore 15 for receiving a two-part plunger assembly 24. The inner barrel 8 includes a second internal bore 14 adapted to receive a valve assembly 60 and a solenoid assembly 70. The spring housing 10 and nozzle housing 11 contain a third internal bore 18 for receiving a tip valve assembly 19 including an axially slidable pressure actuated tip valve element 20 and a spring 22 which biases the tip valve element 20 into the closed position, illustrated in FIG. 1, and further includes injector orifices 17 formed at the innermost end of the nozzle housing 11. The injector orifices 17 are positioned to communicate directly on one side with the combustion chamber of the engine (not shown) and on the other side to communicate with the first internal bore 15 through a series of flow passages which together form a transfer passage 16. As illustrated in FIG. 1, the injector orifice 17 is normally closed by the tip valve element 20. A tip valve chamber 21 is defined by the tip valve element 20 and the third internal bore 18. When the pressure of fuel within the tip valve chamber 21 exceeds a predetermined level, the tip valve element 20 moves upwardly (not shown) to allow fuel to pass through the injector orifices 17 into the combustion chamber (not shown).

Positioned within the first internal bore 15 of the outer barrel 6 is a plunger assembly 24 including an upper plunger portion 26 connected to a link 32 adapted to reciprocate in response to a cam-actuated mechanism (not illustrated), and a lower plunger portion 28. Upper plunger portion 26 is permanently biased towards its outermost position by a relatively high pressure compression spring 30 coaxially received about the link 32 and the plunger assembly 24 between an upper flange 31 and a retaining ring 33. Lower plunger portion 28 is adapted to reciprocate independently of upper plunger portion 26 and is permanently biased towards its innermost position by a compression spring 38 located in the space 39 formed between the upper plunger portion 26 and the lower plunger portion 28. Spring 38 is held in position by reduced diameter portions 27 and 29 extending from the lower end of the upper plunger portion 26 and the upper end of the lower plunger portion 28, respectively. As will be explained below, portions 27 and 29 are adapted to engage during downward movement of upper plunger portion 26 to define a minimum effective length for the plunger assembly 24. A drain passage 40, which communicates with flow passages (not shown) which communicate with the engine drain channel D, is also provided between the upper and lower plunger portions to drain any leaked fuel which may enter space 39. A variable sized lash 34 is formed between the reduced diameter portions 27 and 29 of the upper and lower plunger portions 26 and 28 respectively. The lower end of the lower plunger portion 28 and the lower end of the first internal bore 15 define a variable volume fuel pressurization chamber 36 for receiving fuel from a fuel supply rail FS.

Fuel is provided to the injector, illustrated in FIG. 1, by a fuel supply rail FS which is arranged to supply fuel to the pressurization chamber 36 by way of a fuel supply passage 50 including check valve 52, which allows fuel to flow into the pressurization chamber 36 when the level of pressure in the fuel supply exceeds the level of pressure of fuel within the pressurization chamber 36, but not in a reverse direction. The size of the pressurization chamber 36 can be varied for each cycle of injection operation by varying the pressure of fuel supplied to the pressurization chamber 36 to cause the lower plunger portion 28 to compress spring 38 until the force on the lower plunger portion 28 is balanced. As will be described further hereinafter, transfer passage 16 provides for the flow of fuel out of the variable volume fuel pressurization chamber 36 to a valve assembly 60.

Controlling the flow of fuel out of the variable volume fuel pressurization chamber 36 is a valve assembly 60 including a valve element 62 including a hollow sleeve and radially extending armature 64. The interior of the sleeve forms a flow passage 66 which is part of the transfer passage 16. The figures of each embodiment show the flow passage 66 as a center feed flow passage, but various other flow passages may be used. However, the center feed flow passage eliminates high pressure interfaces which exist in other types of passages and valve assemblies and results in a low volume high pressure flow while also minimizing the volume of fuel under compression.

Figure 2B:
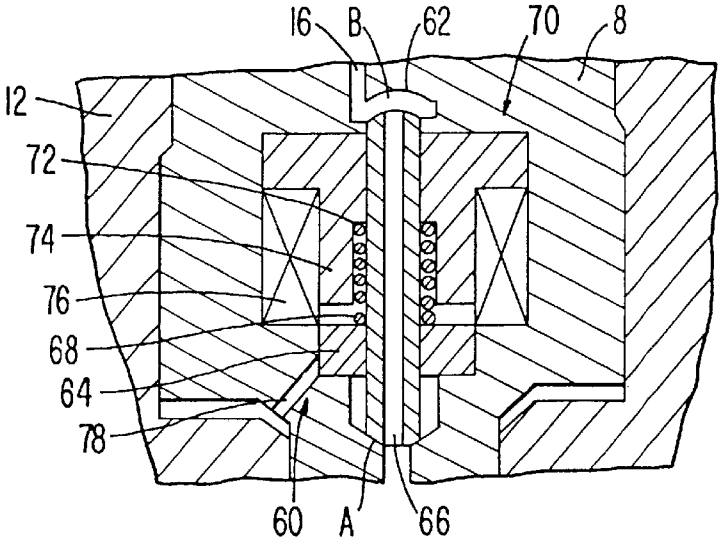
FIG. 2B is a cross-sectional view of the solenoid controlled valve assembly wherein the valve is shown in its second position.
Figure 2A:
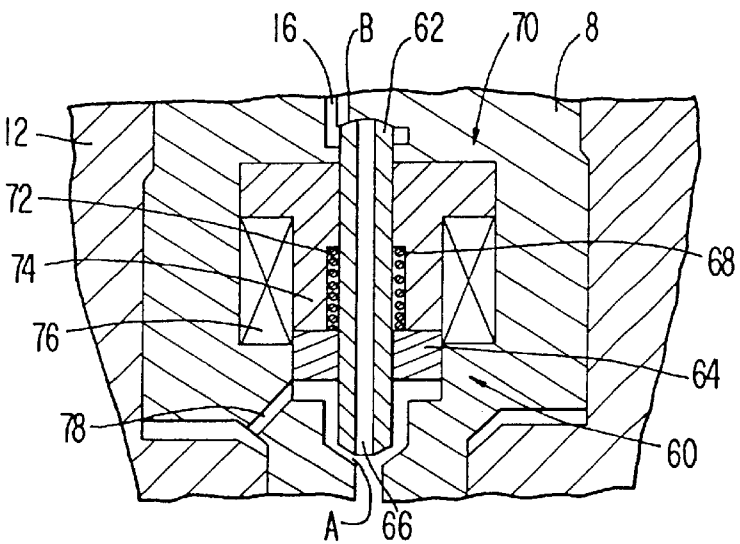
FIG. 2A is a cross-sectional view of the solenoid controlled valve assembly wherein the valve is shown in its first position

Referring also now to FIGS. 2A and 2B, the valve assembly 60, and in particular the valve element 62, moves between its outermost position, shown in FIG. 2A, and its innermost position, shown in FIG. 2B by, generally, a compression spring 68 and a solenoid assembly 70. The solenoid assembly 70 includes a stator 74 made of a paramagnetic material and a coil 76 for cooperating with the armature 64 of valve element 62 to apply a force on the valve element to move it to the position shown in FIG. 2A. The spring 68 is positioned within a downwardly opening recess 72 formed in the stator 74 and extends into contact with armature 64 at the other end. When valve element 62 is in its innermost position, due to the deenergization of the solenoid assembly 70 and force of compression spring 68, the lower portion of the valve element 62 is caused to engage a valve seat A formed in the inner barrel 8.

As illustrated in FIG. 1, when valve element 62 moves away from seat A, due to the energization of the solenoid assembly 70, fluid communication is established between the lower portion 58 (FIG. 1) of passage 16 which communicates with the tip valve chamber 21, and the second internal bore 14 which provides for venting and drainage of fuel into a drain passage 78 which communicates with flow passages, not illustrated, which communicate with the engine drain channel D. The valve element 62 is retained in its outermost position, thereby maintaining seat A in an open position, by the energization of solenoid assembly 70.

As shown in FIG. 2B, a valve seat B is provided adjacent an upper portion of the valve element 62 in the inner barrel 8. When valve element 62 moves to its innermost position (FIG. 2B) fuel is permitted to pass from the variable volume fuel pressurization chamber 36 through the flow passage 16, including transfer passage 66 and flow passages 58 to the tip valve chamber 21. The valve element 62 is moved away from seat B, by the spring 68 upon the deenergization of the solenoid assembly 70. The solenoid generates sufficient attractive force to raise the valve element 62 against the force exerted by the spring 68 and to maintain the upper end of valve element 62 in contact with valve seat B to close thereby flow passage 16. Due to the position of valve seat B, the high fuel injection pressure developed in chamber 36 has very little tendency to move valve element 62 away from seat B since the high fuel pressure is applied essentially radially to valve element 62. The force exerted by the spring 68 is of a sufficient amount to keep the valve element 62 in its innermost position against any back pressure which may exist while allowing the valve element 62 to move upwardly upon energization of the solenoid assembly 70.

Figure 3:
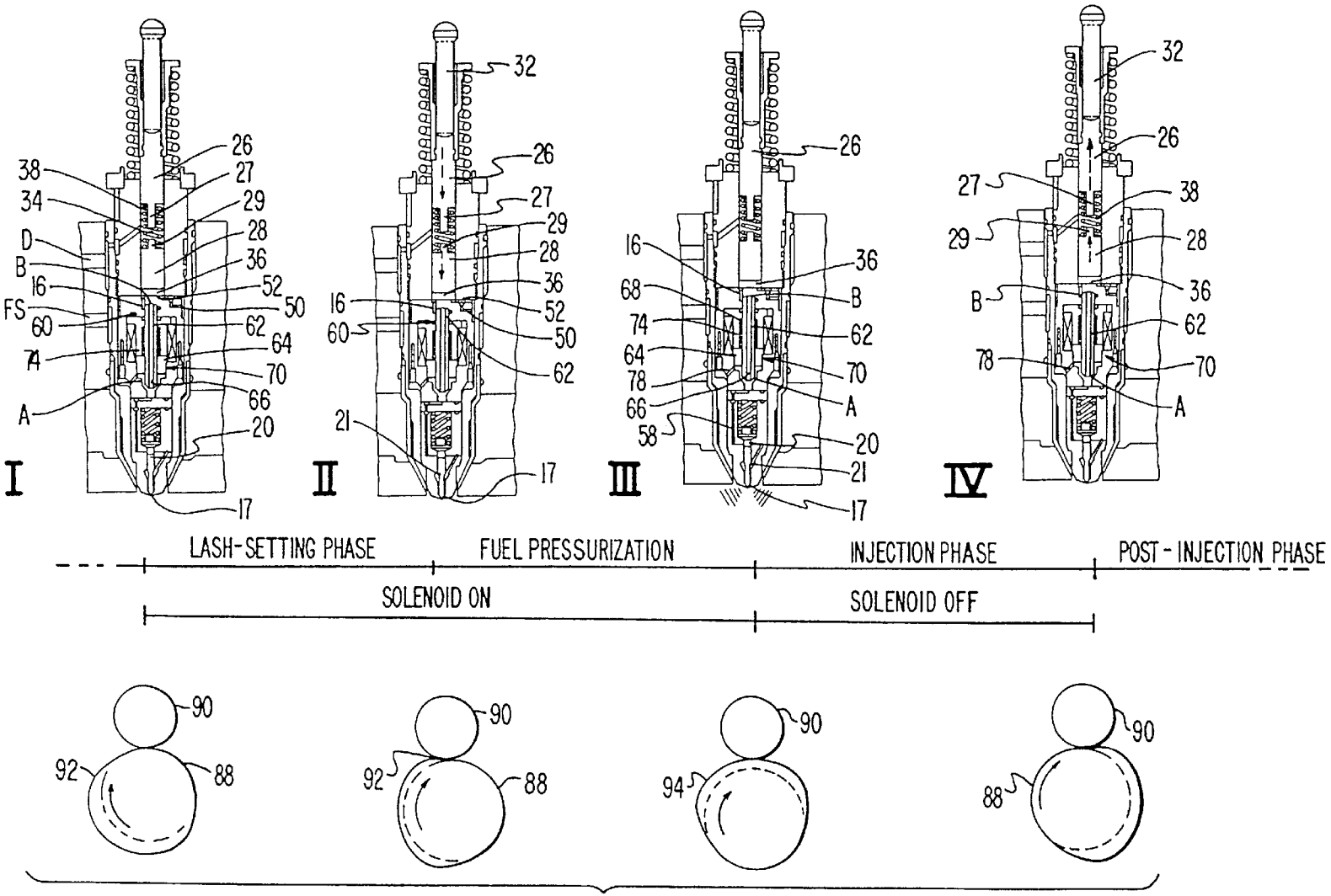
FIG. 3 is a schematic illustration of the sequential operation of the electronically controlled unit fuel injector in accordance With the present invention.

The operation of the embodiment illustrated in FIG. 1 can best be understood by also referring to FIG. 3, which illustrates the sequential stages of a complete injector cycle. At the start of the cycle, prior to the injection phase, the upper plunger portion 26 is in the outermost position (i.e. fully retracted) and the position of the lower plunger portion 28 is dependent upon the amount of fuel metered into the variable volume fuel pressurization chamber 36, as shown in step I of FIG. 3. The valve element 62 is in its outermost position spaced from seat A and engaging seat B as a result of the energization of the solenoid assembly 70 in response to an energizing signal received from an electronic control module (not shown), creating a magnetic attraction between the stator 74 and armature 64 of the valve element 62, also illustrated in FIG. 2A. The tip valve element 20 is consequently in the innermost position thereby closing the injector orifice 17, as also shown in FIG. 1.

Still referring to Step I of FIG. 3, fuel flows through the supply passage 50 through, the check valve 52 and into the upper portion of flow passage 16. Seat B is contacted by the upper end of the valve element 62 and, as a result, fuel is precluded from flowing into the transfer passage 66. The volume of fuel which flows into the fuel pressurization chamber 36 is controlled by varying the fuel supply pressure provided through fuel supply rail FS. So long as the fuel supply pressure is greater than the pressure of the fuel trapped in the fuel pressurization chamber 36, fuel Will continue to flow through the supply passage 50, and the check valve 52, forcing lower plunger portion 28 up towards upper plunger portion 26. As the lower plunger portion 28 moves upwardly, the variable volume fuel pressurization chamber 36 is formed. As the volume of trapped fuel in the pressurization chamber 36 increases, the downward force of coil spring 38 exerted against the lower plunger portion 28 also increases. As will be noted later, the lower plunger portion 2 will not always be at its innermost position at the start of every injection cycle. The position of lower plunger portion 28 is dependent upon the volume of fuel left in the pressurization chamber 36 after the injection event has taken place.

The volume of fuel trapped in the pressurization chamber 36 is dependent upon the fuel supply rail pressure and the spring constant of spring 38 which, in turn, sets the size of lash 34, between the reduced diameter portions 27 and 29 of the upper plunger portion 26 and the lower plunger portion 28. As noted above, the volume of fuel in the pressurization chamber 36 will be increased only if the fuel supply rail pressure is sufficient to overcome the force of spring 38, which urges the lower plunger portion 28 outwardly towards the upper plunger portion 26. When the fuel supply pressure is sufficient to overcome the force of coil spring 38, fuel will enter the variable volume fuel pressurization chamber 36 forcing the lower plunger portion 28 outwardly towards the upper plunger portion 26. This outward movement of the lower plunger portion 28 functions to set the lash 34. When the fuel supply pressure is no longer sufficient to overcome the force of spring 38, fuel can no longer flow into the pressurization chamber 36. At this point in the cycle, the fuel trapped in the pressurization chamber 36 will be at a pressure substantially equivalent to the fuel supply pressure.

The lash-setting phase occurs while the upper plunger portion 26 is in the outermost, fully retracted position. As shown in Step I of FIG. 3, during the lash-setting phase, the inner base 88 of the cam engages the cam follower 90. As the cam rotates and the cam follower 90 begins to scale the ramp or lift portion 92, the link 32 will begin to move inwardly causing the upper plunger portion 26 to also move inwardly. Depending upon the size of the lash 34, lower plunger portion 28 will begin to move inwardly as the reduced diameter portion 27 of the upper plunger portion 26 makes contact with the reduced diameter portion 29 of the lower plunger portion 28. This is shown in Step II of FIG. 3.

The fuel in the pressurization chamber 36 is trapped due to the blockage of passage 16 by valve element 62 of valve assembly 60 and the check valve 52 in flow passage 50. As the lower plunger portion 28 moves inwardly, the pressure of the trapped fuel in the fuel pressurization chamber 36 is significantly increased. During the pressurization phase, the passage 16 remains closed preventing any fuel from entering the flow passages to the tip valve chamber 21 and the injector orifice 17.

Referring now to Step III of FIG. 3, when the fuel pressurization phase has been completed, the upper plunger portion 26 is in the innermost, fully advanced position and the cam is at peak lift. The fuel trapped in the pressurization chamber 36 has been pressurized to the desired level to inject the fuel at a predetermined peak injection pressure. The pressurized fuel in the pressurization chamber 36 will begin to flow out of the chamber when valve element 62 is moved away from seat B.

As also illustrated in FIG. 2B, the solenoid assembly 70 is deenergized in response to loss of the energizing signal from an electronic control module (not shown), thereby terminating the magnetic attraction between the stator 74 and armature 64 of the valve element 62. As a result, the spring 68 forces the valve element 62 in a downward direction, virtually instantaneously opening transfer passage 16 and moving the valve element 62 into contact with valve seat A. This is shown in Step III of FIG. 3.

Upon movement of valve element 62 away from seat B, the high pressure fuel Will flow through the transfer passage 66, into passages 58 leading to the injector orifice 17. The fuel flowing through transfer passage 66 into the passages 58 cannot enter drain passage 78 because valve element 62 will engage seat A to block flow into drain passage 78. The fuel from transfer passage 66 will continue to flow through fuel passage 58 into the tip valve chamber 21 surrounding the tip valve element 20. The pressure of the fuel in the tip valve chamber 21 is sufficiently high to displace tip valve element 20, thereby affecting the injection of fuel through the injector orifice 17.

Once a predetermined amount of fuel has been injected into the engine cylinder (not shown), the solenoid assembly 70 is reenergized, causing the valve element 62 to be displaced in an upward direction, virtually instantaneously engaging seat B and opening passage 78, ending the injection of fuel, shown in Step IV of FIG. 3. The disengagement of valve element 62 from seat A will allow fuel to be vented through the drain passage 78. The engagement of valve element 62 with seat B will prevent the flow of fuel out of the fuel pressurization chamber 36. Although no fuel enters the fuel pressurization chamber 36 during the injection phase, the pressure of the fuel in the pressurization chamber 36, while reduced from peak values, is still high.

Throughout the injection phase the cam is at peak lift and, therefore, the upper plunger portion 26 is in innermost, fully advanced position. After the injection phase, the cam will return to zero lift or its inner base, causing the upper plunger portion 26 to retract, as shown in Step IV of FIG. 3. As described above, the upper plunger portion 26 is physically connected to link 32, which is connected to a cam assembly (not shown) for actuating the upper plunger portion 26. Lower plunger portion 28, however, is adapted to reciprocate independently and is not biased by spring 38 and would not follow except for the reasons outlined below.

The present invention solves the no-follow problem by allowing the fuel in the pressurization chamber 36 to remain under high pressure after the injection phase during the post-injection phase of operation. As a result of the high pressure fuel trapped in the pressurization chamber 36, when the upper plunger portion 26 initially retracts, the lower plunger portion 28 will follow, until the inwardly directed force of spring 38 is greater than the outwardly directed force of the pressurized fuel. In addition to solving the no-follow problem, the energy stored in the fuel remaining in the fuel pressurization chamber 36 is returned to the engine cam shaft due to the elastic compressibility of the fuel.

As the upper plunger portion 26 continues to retract, the lash 34 between the reduced diameter portions 27 and 29 of upper and lower plunger portions 26 and 28 is reformed. When the upper plunger portion 26 is fully retracted, the injection cycle is completed.

As will be appreciated by those skilled in the art, the valve assembly 60 may be reversed, whereby the valve element 62 is maintained in the outermost position, shown in FIG. 2A by the compression spring 68 and retracted to its innermost position, shown in FIG. 2B, by the solenoid assembly 70. In such a case the compression spring must be capable of maintaining the valve element 62 in the outermost position. It should be noted that the injection pressure is almost exclusively applied radially to the valve element except at its upper end which tends actually to assist the spring in holding the valve element against seat A.

As is apparent from the above discussion of the operation of the unit injector of the present invention, the solenoid assembly 70, in response to an electrical control signal, is able to control the timing of injection and the quantity of fuel injected on a cycle-by-cycle basis. If the timing and quantity of fuel injected is controlled in response to changes in engine conditions, improved engine efficiency and pollution abatement can be obtained.

As will also be appreciated by those skilled in the art, the solenoid controlled valve assembly 60 may also serve as a tip valve, such as is described in U.S. patent application Ser. No. 540,288 to Wilber et al., assigned to the applicant of the present invention.

The trapped volume of fuel in the variable volume fuel pressurization chamber 36 is a crucial factor in the capability of the fuel injector of the present invention to maximize average injection pressure. In particular, by including the two-part plunger assembly 24, the disclosed injector is able to control the injection pressure for each cycle of injection operation in dependence on the level of pressure of the fuel received from the fuel supply. As a result, average injection pressure for each cycle can be maximized, thereby increasing engine operating efficiency and pollution abatement. Further, because this novel arrangement allows for decoupling of the injection event from the inward movement of the upper plunger portion 26, injection pressure may be controlled and varied independent of engine speed, thereby allowing injection pressure to be set independently of the other engine operating parameters and conditions. The ability to independently control injection pressure for each cycle of injection operation solely in response to fuel supply pressure substantially increases the injector's ability to maximize engine performance for the wide range of operating environments and varying engine operating conditions.

The average injection pressure, which represents the average pressure of the fuel injected during the injection phase (i.e. during one cycle), can be substantially increased by increasing the trapped volume of fuel in the variable volume fuel pressurization chamber 36. As will be discussed, increasing average injection pressures results in improved atomization of the injected fuel, which has the positive effects of a drastic reduction in particulate and NOx emissions and greatly improved engine performance.

Figure 4:
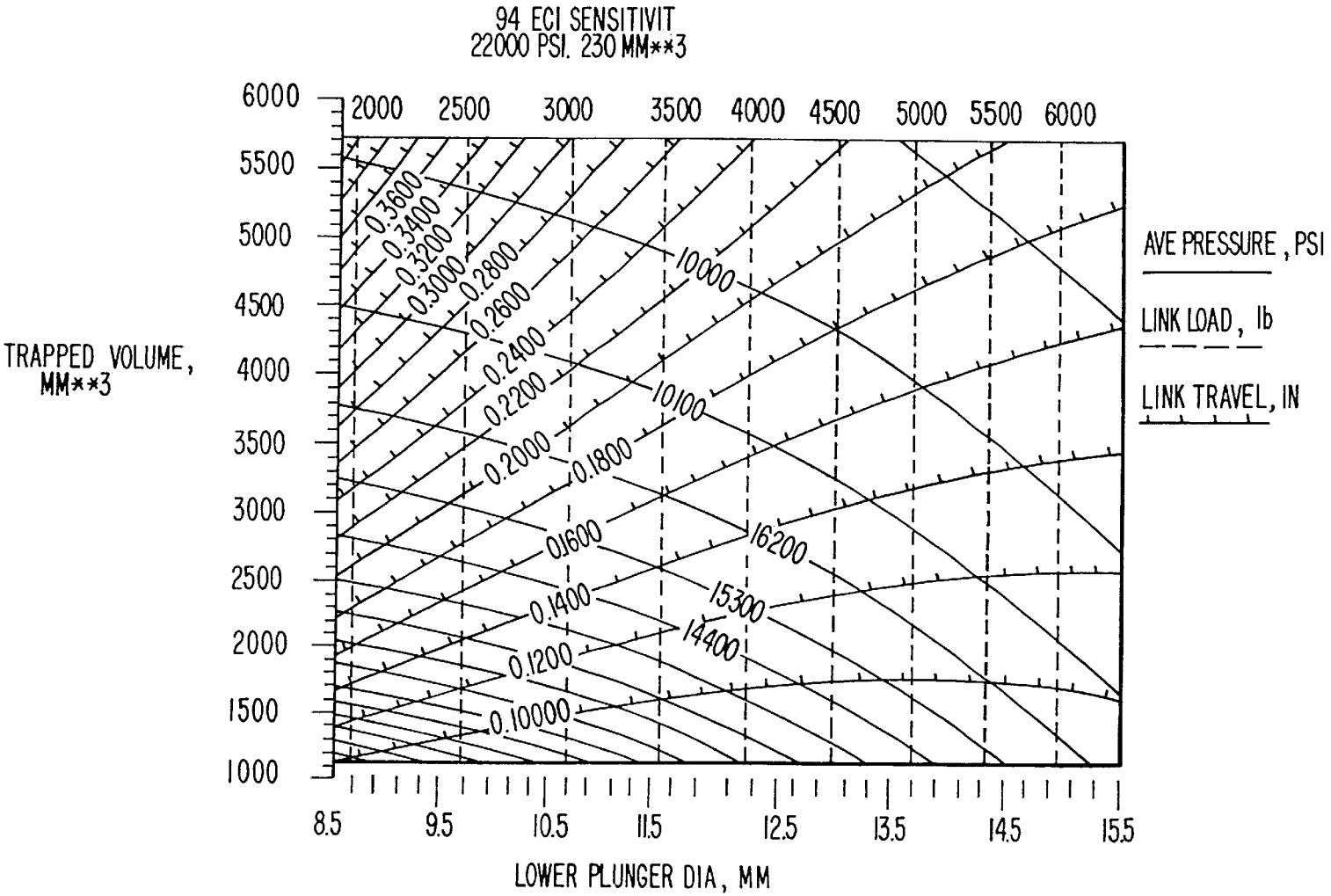
FIG. 4 is a graph illustrating the resulting average pressure, link load and link travel for the electronically controlled unit fuel injector of FIG. 1 given a constant peak pressure and delivery of fuel per cycle.

Reference is now made to FIG. 4, which is a detailed graph of the trapped volume as a function of the diameter of the lower plunger portion 28, given a constant peak injection pressure of 22,000 psi and a constant delivery of fuel per cycle or stroke of 230 $mm^3$. For a given trapped volume of fuel in fuel pressurization chamber 36 and a lower plunger portion 28 diameter, the graph indicates the resulting average pressure (psi), link load (lb) and link travel (in).

The trapped volume of fuel in the fuel pressurization chamber 36 also provides a means for introducing compliancy into the fuel injector of the present invention. Introducing compliancy into the mechanical drive assembly (i.e., the cam, link and plunger assembly) increases the ability of the fuel injector of the present invention to achieve high average injection pressures, given a constant peak injection pressure and a constant amount of fuel delivered or injected per cycle or stroke. The pressure drop from peak injection pressure can be minimized with a more compliant system. Minimization of pressure drop will result in the maximization of average injection pressures.

The plunger assembly 24, link 32 and the cam assembly (not shown) comprise the mechanical portion of the fuel injector 2 and introduce virtually no compliancy into the system. Compliancy is introduced into the fuel injector of the present invention from the trapped volume of fuel in the fuel pressurization chamber 36, which serves as a hydraulic link within the system. The trapped volume, upon pressurization, acts as a hydraulic spring with a hydraulic spring rate k, where $k=(B \cdot A^2)/V$, where B is the bulk modulus of diesel fuel, A is the area of the lower plunger section 28 and V is the trapped volume of fuel in the fuel pressurization chamber 36. As is apparent from this equation, increasing the trapped volume will decrease the hydraulic spring rate k, resulting in an increase in the system compliancy.

In the preferred embodiment of the present invention, link travel should be in the range 0.20–0.35 in., link load should generally be less than 3000 lb., and the average injection pressure should be maximized. Consequently, as can be determined from FIG. 4, a trapped volume in the range of 3000–5000 cubic millimeters is preferred.

In contrast to the design and operation of the fuel injectors shown in the prior art, in the fuel injector of the present invention the pressurization of fuel by movement of a plunger mechanically connected to the engine cam shaft by a link-cam assembly and the injection of the fuel through an injector orifice do not occur simultaneously. This novel and advantageous operation, in which the injection event is decoupled from movement of any mechanical connection to the cam shaft, allows for the control and variation of injection pressure independent of engine speed and substantially reduces hertz stresses placed on the mechanical portions of the injector, resulting in a reduction in unwanted engine emissions by maximizing the average injection pressure.

Figure 6:
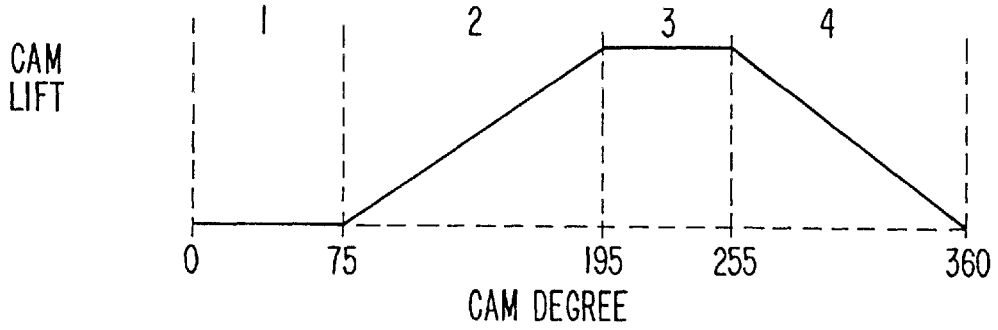
FIG. 6 is a graph illustrating generally the cam lift as a function of cam rotation for the cam of FIG. 5.
Figure 5:
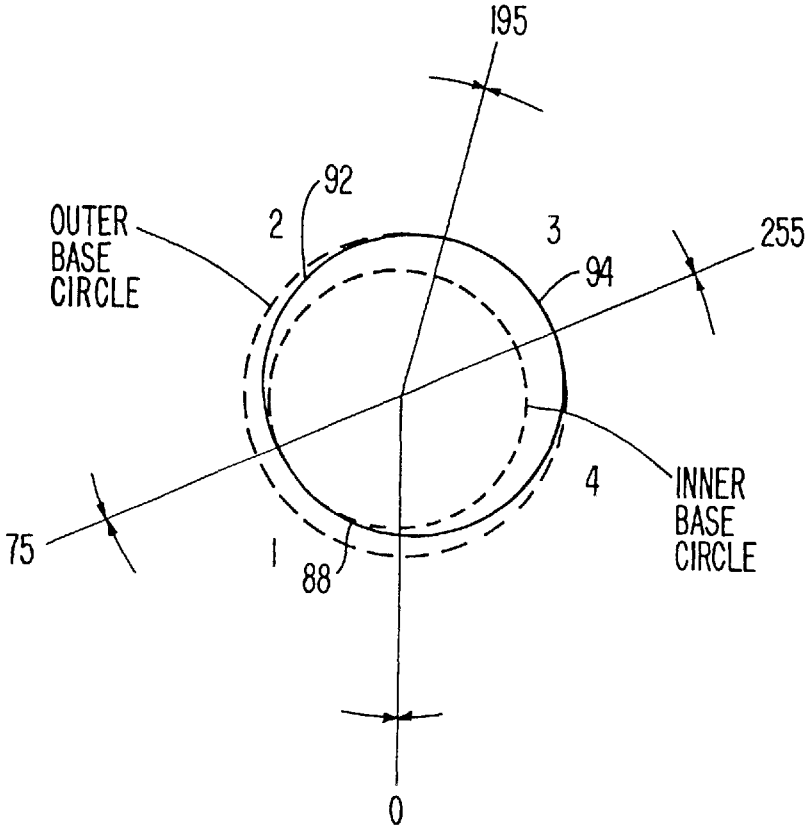
FIG. 5 is a side view of a cam according to the present invention.

As illustrated in FIGS. 5 and 6, the lift profile of the cam of the subject invention is decoupled from the injection event and, therefore, as previously described, avoids the sharp radii of curvature required by known injectors which attain high average injection pressures. As a result of this decoupling, it is not necessary for the plunger, which is driven by the cam assembly, to travel with high velocity to maximize the average injection pressure. The plunger can move inwardly, from the outermost position to the desired inner position, with a relatively low velocity and, correspondingly, low rate of acceleration. The plunger can travel the same distance, from the same beginning and ending points, at a much slower rate than that of the other injectors noted above.

Since plunger movement at a low velocity and low rate of acceleration is acceptable, no need exists for a sharply angled lift ramp or profile on the cam. The ramp or lift portion of the cam, designated as 2 in FIGS. 5 and 6, can be spread out over a greater portion of the cam surface. In the preferred embodiment of the present invention, the lift segment 2 of the cam is between 30°–120° of the circumference of the cam. In contrast, the typical unit fuel injector, wherein injection pressure is dependent upon the velocity of an injector plunger traveling inwardly during the injection event, includes a cam wherein the lift segment comprises only 6° of the circumference of the cam. By significantly increasing the circumference of the cam comprising the lift portion, cam hertz stresses resulting in wear on cam and cam follower surfaces are substantially decreased.

Referring to FIG. 5, the circumference of the cam is divided into four successive unequal segments of 75° (segment 1), 120° (segment 2), 60° (segment 3) and 105° (segment 4). Segment 1, which lies on the inner base circle portion 88 of the cam surface, is a retracted dwell segment in which the cam's engagement with the cam follower 90 causes the upper plunger portion 26 to remain in its outermost, fully retracted position while fuel is supplied to the variable volume fuel pressurization chamber 36, setting the lash. During engagement of the cam follower by segment 2, the plunger advancement segment, the upper plunger portion 26 moves inwardly, toward the lower plunger portion 28, taking up the lash and causing pressurization of the fuel in the variable volume fuel pressurization chamber 36. Segment 3, which lies on the outer base circle portion 94 of the cam surface, is the advanced dwell segment in which the cam causes the upper plunger portion 26 to remain in its innermost, fully advanced position, while the injection event takes place. The final segment, segment 4, is a plunger retraction segment which controls the retraction of the upper plunger portion 26. The following chart indicates the four phases of operation of the injector corresponding to the cam segment:

| SEGMENT | PHASE |
|---|---|
| 1. Retracted Dwell | Lash-Setting Phase |
| 2. Plunger Advancement | Pressurization Phase |
| 3. Advanced Dwell | Injection Phase |
| 4. Plunger Retraction | Post-Injection Phase |

The four segments have corresponding lift profile characteristics as illustrated in FIG. 6, which graphs the cam lift as a function of the cam degrees of rotation.

While the invention has been described with reference to the preferred embodiment, it will be appreciated by those skilled in the art that the invention may be practiced otherwise than as specifically described herein without departing from the spirit and the scope of the invention limited only by the appended claims.

Industrial Applicability

The solenoid controlled variable pressure fuel injector heretofore described may be used in compression injection and spark injection engines of any vehicle or industrial equipment where accurate control and variation of the timing of injection, metering of the proper quantity of fuel and injection pressure is essential. The two-part plunger assembly in combination with the solenoid controlled two position valve element permits the fuel injector of the present invention, in operation, to decouple plunger advancement from injection. This advantageous operation results in a substantial reduction in hertz stresses while maximizing average injection pressures by varying injection pressure for each cycle of injection operation based on engine operating conditions independent of engine speed.

What is claimed is:

1. A unit fuel injector adapted to receive fuel from a fuel supply at relatively low pressure and adapted to inject fuel at relatively high pressure into the combustion chamber of an internal combustion engine, comprising:

(a) an injector body containing a first internal bore and an injector orifice;

(b) a plunger mounted for reciprocating movement within said first internal bore to define a variable volume fuel pressurization chamber into which fuel is received at low pressure from the fuel supply and from which fuel is discharged periodically at relatively high pressure for injection through said injector orifice into the combustion chamber; and (c) injection pressure control means for causing fuel to be injected through the injector orifice at a pressure level which is dependent on variation in the level of pressure of the fuel received from the fuel supply and which is independent of changes in the velocity of the reciprocating movement of said plunger.

2. A unit fuel injector as defined in claim 1 for use in an internal combustion engine having a cam for operating said unit injector, wherein said plunger includes an upper plunger portion which is adapted to reciprocate between advanced and retracted position in response to the rotation of the cam and a lower plunger portion mounted in said first internal bore between said variable volume fuel pressurization chamber and said upper plunger portion.

3. A unit fuel injector as defined in claim 2, wherein said injection pressure control means includes (a) supply means for directing low pressure fuel from the fuel supply into said variable volume fuel pressurization chamber when said upper plunger portion is in said retracted position; and (b) biasing means for biasing said plunger portions apart to thereby vary the volume of fuel which flows into said variable volume fuel pressurization chamber during each cycle of injection operation in dependence on the pressure of the fuel from the fuel supply.

4. A unit fuel injector as defined in claim 3, wherein said upper plunger portion includes a first reduced diameter portion extending toward said lower plunger portion and said lower plunger portion includes a second reduced diameter portion extending toward said upper plunger portion, said reduced diameter portions being positioned to engage during the downward movement of said upper plunger portion to define the minimum effective length of said plunger.

5. A unit fuel injector as defined in claim 4, wherein said biasing means includes a coil spring surrounding said upper and lower plunger reduced diameter portions.

6. A unit fuel injector as defined in claim 5, further including injection timing control means for causing fuel injection during each cycle of injection operation to occur only during the time when said upper plunger portion is in its fully advanced position so that injection pressure is independent of the velocity at which said upper plunger portion moves between its retracted and advanced position.

7. A unit fuel injector as defined in claim 6, wherein said injection timing control means is responsive to an electrical control signal which is adapted to control both the timing and quantity of fuel injected on a cycle-to-cycle basis.

8. A unit fuel injector as defined in claim 7, wherein said injection timing control means includes a valve assembly for controlling the flow of fuel from said variable volume fuel pressurization chamber to said injector orifice.

9. A unit fuel injector as defined in claim 8, wherein said injector body contains a transfer passage for fluid communication between said variable volume fuel pressurization chamber and said injector orifice and wherein said valve assembly includes a valve element reciprocating between:

(a) a first position blocking the flow of fuel from said variable volume fuel pressurization chamber to said injector orifice during movement of said upper plunger portion from its retracted to its advanced position to pressurize the fuel trapped in said fuel pressurization chamber to a relatively high pressure level; and (b) a second position permitting the relatively high pressure fuel to flow from said variable volume fuel pressurization chamber through said injector orifice for discharge into the combustion chamber while said upper plunger portion is held in its advanced position thereby decoupling movement of said upper plunger portion from the discharge of fuel into the combustion chamber.

10. A unit fuel injector as defined in claim 9, wherein said valve assembly includes:

a spring means for biasing said valve element from said first position toward said second position; and an electronically actuated solenoid for moving said valve element to said first position and for maintaining said valve element in said first position upon receipt of an electrical control signal.

11. A unit fuel injector as defined in claim 10, further including check valve means for allowing fuel to flow into said variable volume fuel pressurization chamber when the pressure level within said pressurization chamber is below the pressure level of the fuel supply and for preventing reverse flow of fuel through said supply means when the pressure level in said pressurization chamber is above the pressure level of the fuel supply.

12. A unit fuel injector as defined in claim 11, wherein said valve element includes a hollow sleeve.

13. A unit fuel injector as defined in claim 12, wherein the hollow interior of said sleeve forms a portion of said transfer passage.

14. A unit injector as defined in claim 13, wherein said valve assembly includes a first valve seat adjacent the upper end of said hollow sleeve, said first valve seat being engaged by the upper end of said hollow sleeve when said valve element is in its first position.

15. A unit injector as defined in claim 14, wherein said valve assembly includes a second valve seat adjacent the lower end of said hollow sleeve, said second valve seat being engaged by the lower end of said hollow sleeve when said valve element is in its second position.

16. A unit injector as defined in claim 15, wherein said hollow sleeve is co-axially mounted within said injector body with respect to said plunger.

17. A unit injector as defined in claim 16, wherein said solenoid is concentrically mounted about said hollow sleeve

18. A unit fuel injector as defined in claim 15, wherein said injector body includes a drain passage for discharging fuel from said unit injector and wherein said valve element in its first position forms an opening for permitting the flow of fuel from a tip valve chamber, defined by a pressure actuated tip valve mounted for reciprocating movement in a third internal bore formed in said injector body for allowing the flow of fuel through said injector orifice to said combustion chamber only when the fuel pressure exceeds a predetermined level, into said drain passage and in its second position blocks the flow of fuel from said tip valve chamber into said drain passage.

19. A unit fuel injector as defined in claim 2, wherein the reciprocating movement of said plunger is dependent upon the profile of said cam, said cam profile including a plunger advancement segment for controlling the velocity of upper plunger section advancement and an advanced dwell segment for holding the upper plunger section in its advanced position

20. A unit fuel injector as defined in claim 19, wherein said plunger advancement segment is shaped to extend over a relatively long portion of the cam circumference to cause the upper plunger portion velocity to be relatively low.

21. A unit fuel injector as defined in claim 20, wherein said plunger advancement segment extends over at least 30° of the circumference of the cam.

22. A unit fuel injector as defined in claim 21, wherein said advanced dwell segment follows said plunger advancement segment and is shaped to hold the upper plunger portion in its advanced position during the injection event thereby decoupling upper plunger portion advancement from the injection event.

23. A unit fuel injector as defined in claim 2, further including a drive train for converting rotational movement of said cam into reciprocating movement of the upper plunger portion depending on the profile of said cam and for returning to the cam during each cycle the energy stored in the fuel remaining in the variable volume fuel pressurization chamber following each injection event due to the elastic compressibility of the fuel.

24. A unit fuel injector as defined in claim 3, wherein the maximum volume of fuel trapped in said fuel pressurization chamber in any cycle is less than 5000 cubic millimeters.

25. A unit fuel injector as defined in claim 3, wherein the maximum volume of fuel trapped in said fuel pressurization chamber in any cycle is in the range of 3000 to 5000 cubic millimeters.

26. A unit fuel injector as defined in claim 3 wherein the load applied by said cam to said upper plunger portion is equal to or less than 3000 pounds.

27. A unit fuel injector as defined in claim 3 wherein the upper plunger portion travel is in the range of 0.20 to 0.35 inches.

28. A unit fuel injector adapted to receive fuel from a fuel supply at relatively low pressure and adapted to inject fuel at relatively high pressure into the combustion chamber of an internal combustion engine, comprising:

(a) an injector body having a first internal bore and an injector orifice;

(b) a plunger mounted for reciprocating movement within said first internal bore to define a variable volume fuel pressurization chamber into which fuel is received at low pressure from the fuel supply and from which fuel is discharged periodically at relatively high pressure for injection through said injector orifice into the combustion chamber; and (c) injection pressure control means for controlling the volume of low pressure fuel supplied to the variable volume fuel pressurization chamber during each cycle to vary independent of engine speed the pressure at which fuel is subsequently injected into the combustion chamber within the same cycle of injection operation

29. A unit fuel injector as defined in claim 28, for use in an internal combustion engine having a cam for operating said unit injector, wherein said plunger includes an upper plunger portion which is adapted to reciprocate between advanced and retracted positions in response to the rotation of the cam and a lower plunger portion mounted in said first internal bore between said variable volume fuel pressurization chamber and said upper plunger portion.

30. A unit fuel injector as defined in claim 29, wherein said injection pressure control means includes:

(a) supply means for directing low pressure fuel from the fuel supply into said variable volume fuel pressurization chamber when said upper plunger portion is in said retracted position; and (b) biasing means for biasing said plunger portions apart to thereby vary the volume of fuel which flows into said variable volume fuel pressurization chamber during each cycle of injection operation in dependence on the pressure of the fuel from the fuel supply.

31. A unit fuel injector as defined in claim 30, wherein said upper plunger portion includes a first reduced diameter portion extending toward said lower plunger portion and said lower plunger portion includes a second reduced diameter portion extending toward said upper plunger portion, said reduced diameter portions being positioned to engage during the downward movement of said upper plunger portion to define the minimum effective length of said plunger.

32. A unit fuel injector as defined in claim 31, further including injection timing control means for causing fuel injection during each cycle of injection operation to occur only during the time when said upper plunger portion is in its fully advanced position so that injection pressure is independent of the velocity at which said upper plunger portion moves between its retracted and advanced position.

33. A unit fuel injector as defined in claim 32, wherein said injection timing control means is responsive to an electrical control signal which is adapted to control both the timing and quantity of fuel injected on a cycle-to-cycle basis.

34. A unit fuel injector as defined in claim 33, wherein said injection timing control means includes a valve assembly for controlling the flow of fuel from said variable volume fuel pressurization chamber to said injector orifice.

35. A unit fuel injector as defined in claim 34, wherein said injector body contains a transfer passage for fluid communication between said variable volume fuel pressurization chamber and said injector orifice wherein said valve assembly includes a valve element reciprocating between:

(a) a first position blocking the flow of fuel from said variable volume fuel pressurization chamber to said injector orifice during movement of said upper plunger portion from its retracted to its advanced position to pressurize the fuel trapped in said fuel pressurization chamber to a relatively high pressure level; and (b) a second position permitting the relatively high pressure fuel to flow from said variable volume fuel pressurization chamber through said injector orifice for discharge into the combustion chamber while said upper plunger portion is held in its advanced position thereby decoupling movement of said upper plunger portion from the discharge of fuel into the combustion chamber.

36. A unit fuel injector as defined in claim 35, wherein said valve assembly includes:

a spring means for biasing said valve element from said first position toward said second position; and an electronically actuated solenoid for moving said valve element to said first position and for maintaining said valve element in said first position upon receipt of an electrical control signal

37. A unit fuel injector as defined in claim 36, further including check valve means for allowing fuel to flow into said variable volume fuel pressurization chamber when the pressure level within said pressurization chamber is below the pressure level of the fuel supply and for preventing reverse flow of fuel through said supply means when the pressure level in said pressurization chamber is above the pressure level of the fuel supply.

38. A unit fuel injector as defined in claim 37, further including a pressure actuated tip valve for allowing the flow of fuel through said injector orifice to said combustion chamber only when the fuel pressure exceeds a predetermined level.

39. A unit fuel injector as defined in claim 29, wherein the reciprocating movement of said plunger is dependent upon the profile of said cam, said cam profile including a plunger advancement segment for controlling the velocity of upper plunger section advancement and an advanced dwell segment for holding the upper plunger section in its advanced position.

40. Unit fuel injector as defined in claim 39, wherein said plunger advancement segment is shaped to extend over a relatively long portion of the cam circumference to cause the upper plunger portion velocity to be relatively low.

41. A unit fuel injector as defined in claim 40, wherein said plunger advancement segment extends over at least 30° of the circumference of the cam.

42. A unit fuel injector as defined in claim 41, wherein said advanced dwell segment follows said plunger advancement segment and is shaped to hold the upper plunger portion in its advanced position during the injection event thereby decoupling upper plunger portion advancement from the injection event.

43. A unit fuel injector as defined in claim 29, further including a drive train for converting rotational movement of said cam into reciprocating movement of the upper plunger portion depending on the profile of said cam and for returning to the cam during each cycle the energy stored in the fuel remaining in the variable volume fuel pressurization chamber following each injection event due to the elastic compressibility of the fuel.

44. A unit fuel injector as defined in claim 28, wherein said injection pressure control means controls the pressure at which fuel is injected through the injector orifice dependent on variation in the level of pressure of the fuel received from the fuel supply and independent of changes in the velocity of the reciprocating movement of said plunger.

45. A unit fuel injector as defined in claim 30, wherein the maximum volume of fuel trapped in said fuel pressurization chamber in any cycle is less than 5000 cubic millimeters.

46. A unit fuel injector as defined in claim 30, wherein the maximum volume of fuel trapped in said fuel pressurization chamber in any cycle is in the range of 3000 to 5000 cubic millimeters.

47. A unit fuel injector as defined in claim 30, wherein the load applied by said cam to said upper plunger portion is equal to or less than 3000 pounds.

48. A unit fuel injector as defined in claim 30, wherein the upper plunger portion travel is in the range of 0.20 to 0.35 inches.

49. A unit fuel injector adapted to receive fuel from a fuel supply at relatively low pressure and adapted to inject fuel at relatively high pressure into the combustion chamber of an internal combustion engine, comprising:

(a) an injector body having a first internal bore and an injector orifice;

(b) a plunger mounted for reciprocating movement within said bore to define a variable volume fuel pressurization chamber into which fuel is received at low pressure from the fuel supply for elastic compression by said plunger and from which fuel is discharged periodically at relatively high pressure for injection through said injector orifice into the combustion chamber; and (c) means for utilizing the pressure of the fuel remaining in said variable volume fuel pressurization chamber as a result of the energy stored in the fuel due to the elastic compressibility of the fuel following each injection event to assist in retraction of said plunger.

50. A unit fuel injector as defined in claim [48] *49*, for use in an internal combustion engine having a cam and cam shaft for operating said unit injector, wherein said plunger includes an upper plunger portion which is adapted to reciprocate between advanced and retracted positions in response to the rotation of the cam and a lower plunger portion mounted in said first internal bore between said variable volume fuel pressurization chamber and said upper plunger portion; wherein said means for utilizing acts on said lower plunger portion.

51. A unit fuel injector as defined in claim 50, wherein said means for returning during each cycle the energy stored in the fuel remaining in the variable volume fuel pressurization chamber includes a drive train for linking the reciprocating movement of said upper plunger portion to the rotational movement of said cam to thereby allow for the transfer of the energy stored in the fuel pressurization chamber due to the elastic compressibility of the fuel through the drive train to the cam.

52. A unit fuel injector as defined in claim 51, further including injection pressure control means for causing fuel to be injected through the injector orifice at a pressure level which is dependent on variation in the level of pressure of the fuel received from the fuel supply and which is independent of changes in the velocity of the reciprocating movement of said plunger.

53. A unit fuel injector as defined in claim 52, wherein said injection pressure control means includes:

(a) supply means for directing fuel from the fuel supply into said variable volume chamber when said upper plunger portion is in said retracted position; and (b) biasing means for biasing said plunger portions apart to thereby vary the volume of fuel in which flows into said variable volume fuel pressurization chamber during each cycle of injection operation in dependence on the pressure of the fuel from the fuel supply.

54. A unit fuel injector as defined in claim 53, wherein said upper plunger portion includes a first reduced diameter portion extending toward said lower plunger portion and said lower plunger portion includes a second reduced diameter portion extending toward said upper plunger portion, said reduced diameter portions being positioned to engage during the downward movement of said upper plunger portion to define the minimum effective length of said plunger.

55. A unit fuel injector as defined in claim 54, further including injection timing control means for causing fuel injection during each cycle of injection operation to occur only during the time when said upper plunger portion is in its fully advanced position so that injection pressure is independent of the velocity at which said upper plunger portion moves between its retracted and advanced position.

56. A unit fuel injector as defined in claim 55, wherein said injection timing control means is responsive to an electrical control signal which is adapted to control both the timing and quantity of fuel injected on a cycle-to-cycle basis.

57. A unit fuel injector as defined in claim 56, wherein said injection timing control means includes a valve assembly for controlling the flow of fuel from said variable volume fuel pressurization chamber to said injector orifice.

58. A unit fuel injector as defined in claim 57, wherein said injector body contains a transfer passage for fluid communication between said variable volume fuel pressurization chamber and said injector orifice and wherein said valve assembly includes a valve element reciprocating between:

(a) a first position blocking the flow of fuel from said variable volume fuel pressurization chamber to said injector orifice during movement of said upper plunger portion from its retracted to its advanced position to pressurize the fuel trapped in said fuel pressurization chamber to a relatively high pressure level; and (b) a second position permitting the relatively high pressure fuel to flow from said variable volume fuel pressurization chamber through said injector orifice for discharge into the combustion chamber while said upper plunger portion is held in its advanced position thereby decoupling movement of said upper plunger portion from the discharge of fuel into the combustion chamber.

59. A unit fuel injector as defined in claim 58, wherein said valve assembly includes:

a spring means for biasing said valve element from said first position toward said second position; and an electronically actuated solenoid for moving said valve element to said first position and for maintaining said valve element in said first position upon receipt of an electrical control signal.

60. A unit fuel injector as defined in claim 59, further including check valve means for allowing fuel to flow into said variable volume fuel pressurization chamber when the pressure level within said pressurization chamber is below the pressure level of the fuel supply and for preventing reverse flow of fuel through said supply means when the pressure level in said pressurization chamber is above the pressure level of the fuel supply.

61. A unit fuel injector as defined in claim 60, further including a pressure actuated tip valve for allowing the flow of fuel through said injector orifice to said combustion chamber only when the fuel pressure exceeds a predetermined level.

62. A unit fuel injector as defined in claim 50, wherein the reciprocating movement of said plunger is dependent upon the profile of said cam, said cam profile including a plunger advancement segment for controlling the velocity of upper plunger section advancement and an advanced dwell segment for holding the upper plunger section in its advanced position.

63. A unit fuel injector as defined in claim 62, wherein said plunger advancement segment is shaped to . extend over a relatively long portion of the cam circumference to cause the upper plunger portion velocity to be relatively low.

64. A unit fuel injector as defined in claim 63, wherein said plunger advancement segment extends over at least 30° of the circumference of the cam.

65. A unit fuel injector as defined in claim 64, wherein said advanced dwell segment follows said plunger advancement segment and is shaped to hold the upper plunger portion in its advanced position during the injection event thereby decoupling upper plunger portion advancement from the injection event.

66. A unit fuel injector as defined in claim 53, wherein the maximum volume of fuel trapped in said fuel pressurization chamber in any cycle is less than 5000 cubic millimeters.

67. A unit fuel injector as defined in claim 53, wherein the maximum volume of fuel trapped in said fuel pressurization chamber in any cycle is in the range of 3000 to 5000 cubic millimeters.

68. A unit fuel injector as defined in claim 53, wherein the load applied by said cam to said upper plunger portion is equal to or less than 3000 pounds.

69. A unit fuel injector as defined in claim 53, wherein the upper plunger portion travel is in the range of 0.20 to 0.35 inches.

70. A unit fuel injector adapted to receive fuel from a fuel supply at relatively low pressure and adapted to inject fuel at relatively high pressure into the combustion chamber of an internal combustion engine, comprising:

(a) an injector body having a first internal bore and an injector orifice;

(b) a plunger mounted for reciprocating movement within said first internal bore to define a variable volume fuel pressurization chamber into which fuel is received at low pressure from the fuel supply and from which fuel is discharge periodically at relatively high pressure for injection through said injector orifice into the combustion chamber; and (c) injection pressure control means for responding to a hydraulic control signal defined by the pressure level of the fuel received from the fuel supply for varying injection pressure during each cycle of injection operation substantially independent of engine speed over substantially the entire range of engine operating speeds.

71. A unit fuel injector adapted to receive fuel from a fuel supply at relatively low pressure and adapted to inject fuel at relatively high pressure into the combustion chamber of an internal combustion engine, comprising:

(a) an injector body having a first internal bore and an injector orifice;

(b) a plunger mounted for reciprocating movement with said first internal bore to define a variable volume fuel pressurization chamber into which fuel is received at low pressure form the fuel supply and from which fuel is discharged periodically at relatively high pressure for injection through said injector orifice into the combustion chamber; and (c) injection pressure control means for responding to a hydraulic control signal for varying injection pressure substantially independent of engine speed;

for use in an internal combustion engine having a cam for operating said unit injector, wherein said plunger includes an upper plunger portion which is adapted to reciprocate between advanced and retracted positions in response to the rotation of the cam and a lower plunger portion mounted in said first internal bore between said variable volume fuel pressurization chamber and said upper plunger portion.

72. A unit fuel injector as defined in claim 71, wherein said injection pressure control means includes:

(a) supply means for directing low pressure fuel from the fuel supply into said variable volume fuel pressurization chamber at a predetermined pressure level defining said hydraulic control signal when said upper plunger portion is in said retracted position; and (b) biasing means for biasing said plunger portions apart to thereby vary the volume of fuel which flows into said variable volume fuel pressurization chamber during each cycle of injection operation in dependence on said hydraulic control signal.

73. A unit fuel injector as defined in claim 72, wherein said upper plunger portion includes a first reduced diameter portion extending toward said lower plunger portion and said lower plunger portion includes a second reduced diameter portion extending toward said upper plunger portion, said reduced diameter portions being positioned to engage during the downward movement of said upper plunger portion to define the minimum effective length of said plunger.

74. A unit fuel injector as defined in claim 73, further including injection timing control means for responding to an electrical control signal for varying the timing of fuel injection during each cycle of injection operation causing fuel injection during each cycle of injection operation to occur only during the time when said upper plunger portion is in its fully advanced position so that injection pressure is independent of the velocity at which said upper plunger portion moves between its retracted and advanced position.

75. A unit fuel injector as defined in claim 74, wherein said injection timing control means is responsive to an electrical control signal which is adapted to control both the timing and quantity of fuel injected on a cycle-to-cycle basis.

76. A unit fuel injector as defined in claim 75, wherein said injection timing control means includes a valve assembly for controlling the flow of fuel from said variable volume fuel pressurization chamber to said injector orifice.

77. A unit fuel injector as defined in claim 76, wherein said injector body contains a transfer passage for fluid communication between said variable volume fuel pressurization chamber and said injector orifice and wherein said valve assembly includes a valve element reciprocating between:

(a) a first position blocking the flow of fuel from said variable volume fuel pressurization chamber to said injector orifice during movement of said upper plunger portion from its retracted to its advanced position to pressurize the fuel trapped in said fuel pressurization chamber to a relatively high pressure level; and (b) a second position permitting the relatively high pressure fuel to flow from said variable volume fuel pressurization chamber through said injector orifice for discharge into the combustion chamber While said upper plunger portion is held in its advanced position thereby decoupling movement of said upper plunger portion from the discharge of fuel into the combustion chamber.

78. A unit fuel injector as defined in claim 77, wherein said valve assembly includes:

a spring means for biasing said valve element from said first position toward said second position; and an electronically actuated solenoid for moving said valve element to said first position and for maintaining said valve element in said first position upon receipt of an electrical control signal.

79. A unit fuel injector as defined in claim 78, further including check valve means for allowing fuel to flow into said variable volume fuel pressurization chamber when the pressure level within said pressurization chamber is below the pressure level of the fuel supply and for preventing reverse flow of fuel through said supply means When the pressure level in said pressurization chamber is above the pressure level of the fuel supply.

80. A unit fuel injector as defined in claim 79, further including a pressure actuated tip valve for allowing the flow of fuel through said injector orifice to said combustion chamber only when the fuel pressure exceeds a predetermined level.

81. A unit fuel injector as defined in claim 71, wherein the reciprocating movement of said plunger is dependent upon the profile of said cam, said cam profile including a plunger advancement segment for controlling the velocity of upper plunger section advancement and an advanced dwell segment for holding the upper plunger section in its advanced position.

82. A unit fuel injector as defined in claim 81, wherein said plunger advancement segment is shaped to extend over a relatively long portion of the cam circumference to cause the upper plunger portion velocity to be relatively low.

83. A unit fuel injector as defined in claim 82, wherein said plunger advancement segment extends over at least 30° of the circumference of the cam.

84. A unit fuel injector as defined in claim 83, wherein said advanced dwell segment follows said plunger advancement segment and is shaped to hold the upper plunger portion in its advanced position during the injection event thereby decoupling upper plunger portion advancement from the injection event.

85. A unit fuel injector as defined in claim 71, further including a drive train for converting rotational movement of said cam into reciprocating movement of the upper plunger portion depending on the profile of said cam and for returning to the cam during each cycle the energy stored in the fuel remaining in the variable volume fuel pressurization chamber following each injection event due to the elastic compressibility of the fuel.

86. A unit fuel injector as defined in claim 72, wherein the maximum volume of fuel trapped in said fuel pressurization chamber in any cycle is less than 5000 cubic millimeters.

87. A unit fuel injector as defined in claim 72, wherein the maximum volume of fuel trapped in said fuel pressurization chamber in any cycle is in the range of 3000 to 5000 cubic millimeters.

88. A unit fuel injector as defined in claim 72, wherein the load applied by said cam to said upper plunger portion is equal to or less than 3000 pounds.

89. A unit fuel injector as defined in claim 72, wherein the upper plunger portion travel is in the range of 0.20 to 0.35 inches.

90. A unit fuel injector adapted to receive fuel from a fuel supply at relatively low pressure and adapted to inject fuel at relatively high pressure into the combustion chamber of an internal combustion engine, comprising:

(a) an injector body having a first internal bore and an injector orifice;

(b) a plunger mounted for reciprocating movement within said first internal bore to define a variable volume fuel pressurization chamber into which fuel is received at low pressure from the fuel supply and from which fuel is discharged periodically at relatively high pressure for injection through said injector orifice into the combustion chamber;

(c) injection pressure control means for responding to a hydraulic control signal defined by the pressure level of the fuel received from the fuel supply for varying injection pressure substantially independent of engine speed over substantially the entire range of engine generator speeds; and (d) injection timing control means for responding to a second control signal for varying the timing of fuel injection during each cycle of injector operation.

91. A unit fuel injector as defined in claim 90, for use in an internal combustion engine having a cam for operating said unit injector, wherein said plunger includes an upper plunger portion which is adapted to reciprocate between advanced and retracted positions in response to the rotation of the cam and a lower plunger portion mounted in said first internal bore between said variable volume fuel pressurization chamber and said upper plunger portion.

92. A unit fuel injector as defined in claim 91, wherein said injection pressure control means includes:

(a) supply means for directing low pressure fuel from the fuel supply into said variable volume fuel pressurization chamber at a predetermined pressure level defining said second control signal when said upper plunger portion is in said retracted position; and (b) biasing means for biasing said plunger portions apart to thereby vary the volume of fuel which flows into said variable volume fuel pressurization chamber during each cycle of injection operation in dependence on said second control signal.

93. A unit fuel injector as defined in claim 92, wherein said upper plunger portion includes a first reduced diameter portion extending toward said lower plunger portion and said lower plunger portion includes a second reduced diameter portion extending toward said upper plunger portion, said reduced diameter portions being positioned to engage during the downward movement of said upper plunger portion to define the minimum effective length of said plunger.

94. A unit fuel injector as defined in claim 93, wherein said injection timing control means includes a valve assembly for controlling the flow of fuel from said variable volume fuel pressurization chamber to said injector orifice in response to said second control signal.

95. A unit fuel injector as defined in claim 94, wherein said injector body contains a transfer passage for fluid communication between said variable volume fuel pressurization chamber and said injector orifice and wherein said valve assembly includes a valve element reciprocating between:

(a) a first position blocking the flow of fuel from said variable volume fuel pressurization chamber to said injector orifice during movement of said upper plunger portion from its retracted to its advanced position to pressurize the fuel trapped in said fuel pressurization chamber to a relatively high pressure level; and (b) a second position permitting the relatively high pressure fuel to flow from said variable volume fuel pressurization chamber through said injector orifice for discharge into the combustion chamber while said upper plunger portion is held in its advanced position in response to said second control signal thereby decoupling movement of said upper plunger portion from the discharge of fuel into the combustion chamber.

96. A unit fuel injector as defined in claim 95, wherein said valve assembly includes:

a spring means for biasing said valve element from said first position toward said second position; and an electronically actuated solenoid for moving said valve element to said first position and for maintaining said valve element in said first position upon receipt of said second control signal.

97. A unit fuel injector as defined in claim 96, further including check valve means for allowing fuel to flow into said variable volume fuel pressurization chamber when the pressure level within said pressurization chamber is below the pressure level of the fuel supply and for preventing reverse flow of fuel through said supply means when the pressure level in said pressurization chamber is above the pressure level of the fuel supply.

98. A unit fuel injector as defined in claim 97, further including a pressure actuated tip valve for allowing the flow of fuel through said injector orifice to said combustion chamber only when the fuel pressure exceeds a predetermined level.

99. A unit fuel injector as defined in claim 90, wherein said first control signal is a hydraulic control signal and said second control signal is an electrical control signal.

100. A unit fuel injector as defined in claim 91, wherein the reciprocating movement of said plunger is dependent upon the profile of said cam, said cam profile including a plunger advancement segment for controlling the velocity of upper plunger section advancement and an advanced dwell segment for holding the upper plunger section in its advanced position.

101. A unit fuel injector as defined in claim 99, wherein said plunger advancement segment is shaped to extend over a relatively long portion of the cam circumference to cause the upper plunger portion velocity to be relatively low.

102. A unit fuel injector as defined in claim 101, wherein said plunger advancement segment extends over at least 30° of the circumference of the cam.

103. A unit fuel injector as defined in claim 102, wherein said advanced dwell segment follows said plunger advancement segment and is shaped to hold the upper plunger portion in its advanced position during the injection event thereby decoupling upper plunger portion advancement from the injection event.

104. A unit fuel injector as defined in claim 91, further including a drive train for converting rotational movement of said cam into reciprocating movement of the upper plunger portion depending on the profile of said cam and for returning to the cam during each cycle the energy stored in the fuel remaining in the variable volume fuel pressurization chamber following each injection event due to the elastic compressibility of the fuel.

105. A unit fuel injector as defined in claim 92, wherein the maximum volume of fuel trapped in said fuel pressurization chamber in any cycle is less than 5000 cubic millimeters.

106. A unit fuel injector as defined in claim 92, wherein the maximum volume of fuel trapped in said fuel pressurization chamber in any cycle is in the range of 3000 to 5000 cubic millimeters.

107. A unit fuel injector as defined in claim 92, wherein the load applied by said cam to said upper plunger portion is equal to or less than 3000 pounds.

108. A unit fuel injector as defined in claim 92, wherein the upper plunger portion travel is in the range of 0.20 to 0.35 inches.

*109. A unit injector as defined in claim 49, further including an injection timing control valve for causing fuel injection during each cycle of injection operation, said injection timing control valve responsive to an electrical control signal which is adapted to control both the timing and quantity of fuel injected on a cycle-by-cycle basis.*

*110. A unit injector as defined in claim 109, wherein the unit fuel injector further includes a drain passage, said injection timing control valve is movable between a first position blocking high pressure fuel flow to said drain passage and a second position permitting high pressure fuel flow to said drain passage.*

*111. A unit injector as defined in claim 49, wherein said means for utilizing the pressure of the fuel to assist in the retraction of the plunger, acts on said plunger for returning during each cycle the energy stored in the fuel to the engine.*

*112. A unit injector as defined in claim 111, wherein the engine includes a cam and cam shaft for operating the unit injector, said means for utilizing the pressure of the fuel to assist in the retraction of the plunger and for returning during each cycle the energy stored in the fuel to the engine including a drive train for linking the reciprocating movement of the plunger to the rotational movement of the cam to thereby allow for the transfer of the energy stored in the fuel pressurization chamber due to the elastic compressibility of the fuel through the drive train to the cam.*

*113. A unit injector as defined in claim 49, further including a pressure actuated tip valve for allowing the flow of fuel through said injector orifice to said combustion chamber only when the fuel pressure exceeds a predetermined level.*

*114. A unit injector as defined in claim 49, wherein a maximum volume of fuel trapped in said fuel pressurization chamber in any cycle is less than 5000 cubic millimeters.*

*115. A unit injector as defined in claim 49, wherein a load applied by a cam to said plunger is equal to or less than 3000 pounds.*

* * * * *